United States Patent [19]

Erbstoesser et al.

[11] Patent Number: 4,526,695

[45] Date of Patent: Jul. 2, 1985

[54] COMPOSITION FOR REDUCING THE PERMEABILITY OF SUBTERRANEAN FORMATIONS

[75] Inventors: Steven R. Erbstoesser, Missouri City; Claude E. Cooke, Jr., Houston, both of Tex.; Richard G. Sinclair; Michael M. Epstein, both of Columbus, Ohio

[73] Assignee: Exxon Production Research Co., Houston, Tex.

[21] Appl. No.: 464,084

[22] Filed: Feb. 4, 1983

Related U.S. Application Data

[62] Division of Ser. No. 291,200, Aug. 10, 1981, Pat. No. 4,387,769

[51] Int. Cl.$^3$ .............................................. E21B 33/138
[52] U.S. Cl. ................................ 252/8.55 R; 166/295; 166/284
[58] Field of Search .......... 252/8.55 R, 8.5 C, 8.55 C; 523/130; 524/601, 604, 605; 166/281, 282, 283, 284, 295

[56] References Cited

U.S. PATENT DOCUMENTS

| | | | |
|---|---|---|---|
| 2,362,511 | 11/1939 | Teeters | 525/443 X |
| 3,302,719 | 2/1967 | Fischer | 166/295 |
| 3,708,560 | 6/1973 | Mayer et al. | 252/8.55 R X |
| 3,784,585 | 1/1974 | Schmitt et al. | 525/445 |
| 3,989,632 | 11/1976 | Fischer et al. | 252/8.55 R |

Primary Examiner—Herbert B. Guynn
Assistant Examiner—Virginia B. Caress
Attorney, Agent, or Firm—James J. Riley, Jr.; Marc L. Delflache

[57] ABSTRACT

The present invention relates generally to the composition and method for reducing the permeability of subterranean formations penetrated by a wellbore. The composition of the present invention comprises a wellbore fluid having dispersed therein a fluid loss control agent comprising a polyester polymer which is substantially insoluble in the wellbore fluid. The polymer degrades in the presence of water at an elevated temperature to form small molecules which are soluble in a fluid in the subterranean formation. The method of the present invention comprises reducing the permeability of subterranean formations penetrated by a wellbore by placing the composition of the present invention down the wellbore.

5 Claims, 2 Drawing Figures

COMPOSITION FOR REDUCING THE PERMEABILITY OF SUBTERRANEAN FORMATIONS

This application is a division of application Ser. No. 291,200, filed Aug. 10, 1981 now U.S. Pat. No. 4,387,769.

BACKGROUND OF THE INVENTION

The present invention relates to a composition and method for temporarily reducing the permeability of subterranean formations and in particular relates to a composition and method for preventing fluid loss to subterranean formations during well treatments.

At various times during the life of a well, formed in a subterranean formation for the production of oil and gas, it is desirable to treat the well. Such treatments include perforating, gravel packing, fracturing, and acidizing. These treatments generally involve filling the wellbore with a standing or circulating treating fluid. Although high fluid permeability is an important characteristic of a hydrocarbon-producing formation, these treatments may be adversely effected by loss of treating fluid into the highly permeable formations. For example, in an acidizing treatment where it is desired to treat the least permeable formation to improve its permeability, the formation strata having the higher permeability will most likely consume the major portion of the treatment fluid leaving the least permeable formation strata virtually untreated. Therefore it is desired to control the loss of treating fluids to the high permeability formations during such treatments. During fracturing treatments it is desirable to control loss of the treating fluid to formation to maintain a wedging effect and propagate the fracture. During perforating operations, it is desirable to prevent fluids from entering the formation and damaging the formation. During gravel pack operations, it is desirable to recover the expensive workover fluids from the wellbore after completion of the operation. Therefore, the efficient performance of some treatments of the wellbore require temporarily reducing permeability of formation strata to reduce the loss of treating fluid to these formation strata during treatment. Several fluid loss agents have been developed for use in these treatments.

One type of prior fluid loss control agent comprised finely divided solids dispersed in the treating fluid. As the treatment fluid leaked off into the formation, the finely divided solid materials were filtered out onto the face of the formation and formed a filter cake. The filter cake functioned to restrict the flow of fluid therethough and substantially reduce treatment fluid leak off to the formation. Prior types of solid materials included crushed naphthalenes and benzoic acid, crushed oyster shells, silica flower or guar-coated silica flower or crushed limestone and rock salt. The water-soluble materials dissolved during the treatment operation and therefore were unsuitable in many cases. The inert materials formed a solid filter cake which remained on the formation face after completion of the treatment thereby causing, in some cases, permanent damage to the production capability of the formation.

Other types of fluid loss control agents comprised oil-soluble, water-insoluble materials. Prior art materials included soaps, gels, waxes, and various types of polymers of resins such as those disclosed in SPE Papers 5662 (1975) and 5713 (1976) and U.S. Pat. Nos. 3,998,272; 3,979,304; 3,979,305; 3,989,632; 3,882,029; 3,181,612; 3,252,904, 3,336,979 and 3,319,716 which discloses oil soluble polyesters. These materials were mixed with the treatment fluid and injected into the wellbore. These materials also formed a filter cake on the face of the formation to prevent treatment fluid leakoff. It was intended that these materials be dissolved in the subterranean hydrocarbon fluids as the temperature of the formation increases after the treatment operation. Although these materials were suitable in some applications, in fracturing treatments and treatment of gas wells, these materials, in some cases, left a residue on the face of the formation after completion of the treatment thereby causing permanent damage to the production capabilities of the formation.

Water soluble and acid degradable polymeric fluid loss control agents have also been utilized in the prior art as disclosed in U.S. Pat. No. 3,319,716 and SPE Papers 3653 (1971). A field practice of removing these materials after treatment involved acidizing the formation after treatment. Although these materials were suitable in some applications, in those cases where there was incomplete acid contact with the fluid loss control material, these materials also left a residue in the formation after treatment thereby damaging the production capabilities of the well.

Another type of fluid loss control agent known as ball sealers have been developed for use during diversion treatments in cased perforated wellbores. The diversion treatments generally comprise diverting the treatment fluid from the more permeable formation strata to the least permeable formation strata to enable treatment of the least permeable formation strata. The ball sealers, which generally comprise small, rubber-coated balls, were suspended in the treating fluid and pumped into the well along with the treating fluid. The balls were carried down the interior of the casing to the perforations communicating with the high permeability formation strata. The ball sealers seated on these perforations and diverted the treating fluid to a formation strata having a lower permeability. In some applications, the presence of the ball sealers in the wellbore after the treatment presented operational problems.

Therefore, there is still a need for a fluid loss control diverting agent which can effectively prevent fluid loss during treatment operations and is capable of being removed from the well after treatment operations without leaving any residue in the wellbore or on the formation strata.

SUMMARY OF THE INVENTION

The present invention relates generally to the composition and method for reducing the permeability of subterranean formations penetrated by a wellbore. The composition of the present invention comprises a wellbore fluid having dispersed therein a fluid loss control agent comprising a polyester polymer which is substantially insoluble in the wellbore fluid. The polymer degrades in the presence of water at an elevated temperature to form small molecules which are soluble in a subterranean formation fluid. The polyester preferably has the repeating unit:

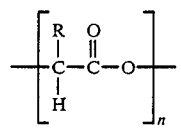

where R is selected from the group consisting of hydrogen or alkyl and n is preferably sufficiently large to form a solid material at ambient surface conditions. Preferably, the polymeric material is formed as discrete solid structures including finely divided particles, intermediately sized particles, or other discrete structures such as ball sealers. Preferably, the polymer is selected from the group comprising poly(D,L-lactide), crosslinked poly(D,L-lactide), and the copolymers of glycolide and D,L-lactide. The method of the present invention comprises reducing the permeability of subterranean formations penetrated by a wellbore by placing the composition of the present invention down the wellbore.

BRIEF DESCRIPTION OF THE DRAWINGS

A more detailed description of the present invention is set forth in the following description of the preferred embodiments and from the accompanying drawings in which.

DESCRIPTION OF THE PREFERRED EMBODIMENTS

Figure 1:
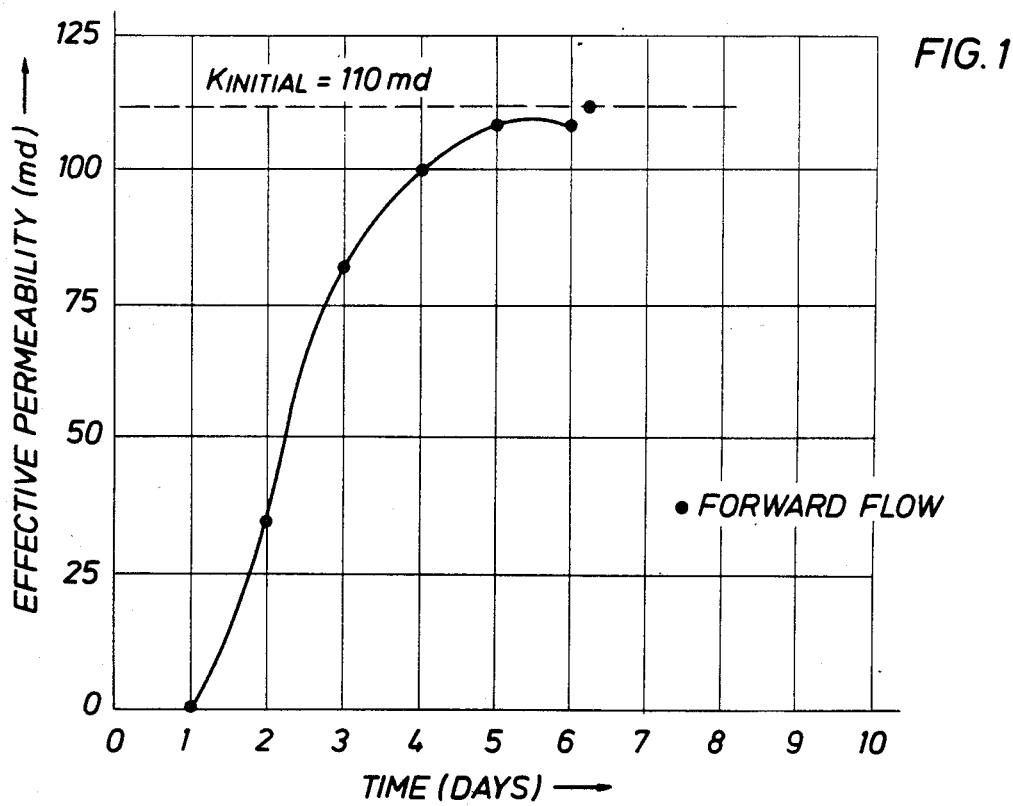
FIG. 1 is a graph illustrating the degradability of a polymer of the present invention.

The preferred composition of the present invention comprises a wellbore fluid having dispersed therein a fluid loss control agent comprising a polyester polymer which is substantially insoluble in the wellbore fluid. The polymer degrades in the presence of water at the elevated temperature of the formation to form small molecules which are soluble in a subterranean formation fluid. The polyester preferably has the repeating unit:

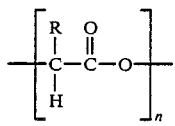

wherein R is selected from the group consisting of hydrogen or alkyl and n has a value which is sufficiently large to form a solid material at ambient surface temperatures and pressures. The polymer is substantially insoluble in the wellbore fluid which substantially prevents the polymer from softening due to the dissolving of the polymer in the wellbore fluid. Such softening may interfere with the fluid loss control capability of the polymer by, in some cases, enabling particulate forms of the polymer to be extruded into the formation during the treatment operation. Therefore, if the wellbore fluid is an oil-based fluid, the polymer should be substantially insoluble in oil. On the other hand, if the wellbore fluid is a water-based fluid, the polymer should be substantially insoluble in water. It will be obvious to one skilled in the art that by varying such factors as degree of crosslinking, crystallinity, molecular polarity, degree of hydrophobicity of the hydrocarbon units between the ester linkages etc., one can vary the solubility characteristics of the polymer. Since wellbore fluids, in many cases, contain at least minor amounts of both water and oil, in the most preferred embodiment of the present invention, the polymer is substantially insoluble in both water and oil.

The polymers of the present invention substantially degrade in the presence of water at an elevated temperature in a relatively short period of time, from about 1 to about 7 days to small molecules (hereinafter referred to as oligomers) in which the number of repeating units is small, such as, for example, monomers, dimers, trimers and the like. Preferably, the polymers will degrade at elevated temperatures which are equivalent to the temperatures of subterranean formations from about 45° C. to about 200° C. If desired, after the treatment operation, the formation surrounding the wellbore may be heated up to an elevated temperature by the injection of steam or other hot liquid to facilitate degradation of the polymers. Preferably, the polymers will degrade in the presence of minor amounts of water, such as the connate water dissolved in the subterranean hydrocarbon fluids. Thus the polymers of the present invention which are used in a well treatment will, after a short period of time in the formation degrade to oligomers. The resulting oligomers are at least partially soluble in a fluid present in the formation, such as the connate water or oil or injected fluids, to facilitate their removal from the formation. The oligomers may be partially soluble in both water and oil.

It will be obvious to one skilled in the art that various alkyl moieties, R, may be utilized in the practice of the present invention. For example, the alkyl moiety may have from 1 to 4 carbon atoms. The alkyl group may be a linear or branched and may also be saturated or unsaturated. Examples of suitable alkyl groups may be methyl, ethyl, propyl, butyl, pentyl and branched and substituted derivatives of the above. Suitable substituents for the alkyl groups may include halogens and other groups such as, cyano, ether or amino. It will be obvious to one skilled in the art that R may be other moieties which do not interfere with the hydrolytic degradation of the polymer.

The value of n is preferably large enough to form a solid polymeric material under ambient surface temperatures and pressures. The solid material can then be used in the practice of the invention as discrete solid structures which include finely divided particles, intermediately sized particles or structures such as ball sealers. The finely divided materials preferably have a size range from about 0.1 to about 100 microns. The intermediately sized particles preferably have a size range from about 850 microns up to about 1500 microns. The ball sealers preferably have a size range from about one-half inch to about one inch in diameter depending on the size of the perforation in the casing. At the formation temperature and pressure, the polymer preferably exists as a hard solid. However, under some formation or treating conditions, the polymer may exist as a semi-solid.

In some cases, the fluid loss control agent may comprise other materials such as colloidal polymers to aid sealing capability of the agent or microspheres for density control of ball sealers. It will be obvious to one skilled in the art that the agent may also comprise other materials known in the industry.

Preferably, the polymers for use in the practice of the present invention are selected from the group comprising poly(D,L-lactide), crosslinked poly(D,L-lactide) and the copolymers of glycolide and D,L-lactide. Polymers may also be prepared from pure optical isomers as well. The selection of an appropriate preferred polymer for use in the practice of the present invention will be dependent, in part, upon the conditions which exist in the wellbore. The rate of degradation of the preferred polymer of the present invention depends, amongst other things, upon the temperature, the solubility of water in the surrounding fluid, the polymer particle size, the polymer molecular weight, the degree of crystallinity of the polymer, the solubility and diffusibility of water in the polymer, and the reactivity of the ester bonds comprising the polymer. Broadly, the rate of degradation of a given polymer by hydrolysis may be temperature or water transport limited. Rapid degradation by hydrolysis may occur through the particle rather than only at the particle surface. Permeability to water which is a function of the solubility and diffusivity of water in the polymer is only possible above the glass transition temperature for the polymer. In polymers which are partially crystalline only the amorphous regions are permeable at temperatures below the melting temperature of the crystalline regions. The crystalline regions become amorphous and permeable only above the melting temperature where solid structures formed from the polymer lose their integrity. To a large extent it is the amorphous character of the polymer which enables water to penetrate into the interior of the polymer where it can react with ester linkages to more readily degrade the polymer. Thus, in the practice of the present invention, a polymer should be selected which is substantially amorphous in use and which has a glass transition temperature below that temperature at which it is desired that it degrade in application.

At ambient surface temperatures, there is preferably no discernable degradation of the preferred polymers of the present invention. Thus, the polymers may be stored at the well site without special precautions until their use. Crosslinking the polymers slows down the rate of degradation of the polymers.

The preferred polymers of the present invention are well known to those skilled in the art. Homopolymers and copolymers of glycolide and lactide have been disclosed in numerous U.S. patents such as Nos. 2,362,511; 2,683,136; 2,703,316; 2,758,987; 3,201,309; 3,463,158; 3,531,561; 3,620,218; 3,636,956; 3,736,646; 3,859,297 and 3,912,692, the disclosures of which are incorporated herein by reference. These polymers have also been discussed in scientific publications and foreign patents such as Canadian Pat. No. 863,673; British Pat. No. 779,291; German Pat. No. 1,153,902; Collected Papers of Wallace H. Carothers, Vol. 1, Interscience Publishers, Inc., N.Y. (1940); F. J. van Natta et al, Am. Ch. Soc. 56,455 (1934); Ber. Dent. Chem 36, 1200 (1930), W. H. Carothers et al, J. Am. Ch. Soc. 54, 761 (1932). Copolymers of glycolides and lactides with other monomers have been disclosed in U.S. Pat. No. 3,784,585.

The homopolymers and copolymers of the preferred polymers of the present invention are preferably formed by heating the mixture of monomers to a temperature above the melting point of the monomer. However, it is preferred to maintain the reaction temperature below about 210° C. because of the tendency of polymers formed at higher temperatures to degrade more readily.

The polymerization is preferably carried out in an inert atmosphere, such as nitrogen or helium, or in a vacuum. Because water acts as a chain termination agent, the polymerization reaction is preferably carried out in an anhydrous environment in order to obtain the desired higher molecular weight polymers. The reaction may also be by emulsion or dispersion polymerization. Suitable polymers for the practice of the present invention have a molecular weight range (weight average) preferably from about 5000 to about 100,000. It is preferred that the polymerization reaction be catalyzed by a suitable catalyst such as divalent metal oxides or organic metal compounds. Suitable catalyst may include stannous octanoate, zinc acetate, cadmium acetate, aluminum acetate or butanoate, tin chloride, tin benzoate, and antimony oxide. Stannous octanoate is the preferred catalyst. The particulate polymer may be formed by putting the polymer in a hammer mill or air micronizer and by emulsion or dispersion polymerization. Ball sealers comprised of the polymer may be formed by injection molding.

It will be obvious to one skilled in the art that other types of polyesters and copolymer of polyesters having the properties of the polymers of the present invention can be utilized in the practice of the present invention. For example, copolymers of polyesters comprised of monomer of lactides or glycolides and other monomers similar to those disclosed in U.S. Pat. No. 3,784,585 may be useful in the practice of the present invention.

The method of the present invention comprises generally forming an aqueous or nonaqueous wellbore fluid having dispersed therein the fluid loss control agent and placing the wellbore fluid into the wellbore. The wellbore fluid may be a treating fluid or a carrier fluid or the like. The wellbore fluid may be injected into the wellbore and the formation or may be circulated in the wellbore. When the wellbore fluid is injected into the wellbore, the fluid loss control agent may be suspended in the first slug of the fluid which is pumped into the well during treatment. The first slug of wellbore fluid may be a portion of the treating fluid or a carrier fluid preceding the treatment fluid. As this first slug of fluid flows into the more permeable formation strata, the fluid loss control agent reduces the permeability of the formation to thereby divert the second slug of fluid to less permeable formation strata. Alternatively, the wellbore fluid may be used to equalize the permeability of all the formations and enable injection of equal volumes of fluid to all the formations. In fracturing treatments, the fluid loss agent is normally dispersed in the fracturing fluid and minimizes fluid loss during the treatment to maintain the wedging effect and propagate the fracture. In other applications, such as perforating or gravel packing, a high concentration slug of wellbore fluid may be placed at the appropriate location of the wellbore during the treatment.

The wellbore fluid can be comprised of water, oil, xylene, toluene, brines, water-in-oil emulsions or oil-in-water emulsions. The brines may contain at least 1% by weight of the soluble salts of potassium, sodium, or calcium in water. In addition, the brine solution may contain other soluble salts of, for example, zinc, chromium, iron, copper, and the like. Generally, chloride salts are employed because of their availability. However, other salts such as bromides, sulfates and the like can also be used in the practice of the present invention. In addition to the above, the treating fluid may also contain other components, additives, and the like known to those skilled in the art. However, additives which react with the polymer or with the degradation products of the polymer would be contraindicated.

The amount of polymer required to enable successful fluid control will vary widely depending upon the size of the formation, the degree of permeability of the formation, the size of the polymer particle and other variables, such as wellbore fluid viscosity and permissible fluid loss volumes. However, it is believed that for the finely divided particles and intermediately sized particles, from about 1 to about 10 pounds of polymer per 100 barrels of wellbore fluid will be sufficient in most applications.

After the wellbore fluid has been injected into the formation, the fluid loss control agent minimizes penetration of the treating fluid into the formation. After the treatment has been completed, the well may be shut in to allow the formation to heat back up to its ambient temperature. At the higher temperature, the polymer of the present invention will slowly degrade in the presence of connate water to form oligomers. In most cases, it will take from about 1 day to about 7 days for the polymer to degrade. The oligomers are at least partially soluble in a formation fluid and are readily removed from the well during production.

The following examples are merely illustrative of the present invention. Examples 1-3 set forth laboratory procedures for preparing polymers suitable in the practice of the present invention. Examples 4-11 illustrate the use of the polymers in the practice of the present invention.

Polymer Preparation

EXAMPLE 1

Poly(D,L-Lactide)

945 grams of crude D,L-lactide, a semisolid (available from Clinton Corn Products, m.p. 95° to 116° C.,-vague) were recrystallized from hot methyl isobutyl ketone (MIBK) with the aid of decolorizing charcoal. 665 grams of large, colorless crystals were obtained (m.p. 116 to 128 C., 3 isomers). After two more crystallizations from a 400-ml quantity of MIBK, 600 grams of pure monomer were obtained. These were dried by tumbling in vacuo with a nitrogen bleed, charged into a large glass ampoule with 0.8 gram of anhydrous stannous octanoate, and sealed under vacuum by means of a torch at the constriction in the neck of the ampoule. The ampoule was placed in a 130° to 145° C. oil bath for 3 days, insuring that the initial monomer-catalyst mixes well during melting, but before polymerizing. The polymerizate was cooled behind a shield, the glass broken and ground off on a rough carborundum wheel, and the polymer cut up and flash-molded into sheets. GPC molecular weights: $M_w=114,400$; $M_n=49,300$.

EXAMPLE 2

Glycolide

Glycolide was prepared from glycolic acid by means similar to U.S. Pat. No. 2,668,162. This involves preparing an oligomeric poly(glycolic acid) by a catalyzed polycondensation, followed by catalytic depolymerization to glycolide. Purification was accomplished by recrystallizations from ethyl acetate and drying.

Thus, 2.5 kg of glycolic acid were heated for 45 hours at 155° to 175° C. under nitrogen, removing 300 ml of by-product water by distillation. Toward the end of the distillation a vacuum of 95 to 120 torr was applied. After 18 hours, the product opacifies and solidifies. Total by-product water was 550 ml (plus hold-up volume), which compares to a theoretical value of 590 ml. The heating bath temperature was increased to 237° C. in order to melt the oligomeric product; then 25 g of $Sb_2O_3$ were mixed in, the melt poured into trays, and broken up after cooling and solidification has taken place. The yield was 1975 g (theory, 1910 g, or 103 percent). The low-molecular weight poly(glycolic acid) (PGA) was reduced to a particle size of less than 3.36 mm, using a grinder, and stored in a desiccator.

A 500-ml, 3-neck flask was equipped with an efficient mechanical stirrer, distillation side-arm connected to a vacuum pump, and an addition funnel with a 9-mm bore stopcock. The flask was heated by means of a Woods metal bath at 280° C. under 5-10 torr. Aliquots of PGA are added with rapid stirring at a rate which maintains a steady distillation of product glycolide without substantial charring of the pot contents. 1405 g of PGA were added incrementally, and 1210 g of glycolide were received. The latter was dissolved in 1000 ml of refluxing, dry ethyl acetate, mixed with 10 g of activated charcoal, filtered and allowed to recrystallize. Two more recrystallizations and vacuum drying obtains 785 g of snow-white crystals, m.p. 86° to 87° C.

EXAMPLE 3

Copolymers

Glycolide can be copolymerized with lactide. In the above procedure, glycolide and lactide can be charged into the ampoule, catalyst added, and the polymerization carried out as described. A series of copolymers can be prepared, varying the ratio of monomers, to obtain copolymers with increasing softening points with increasing glycolide content. At greater than approximately 95% glycolide, however, the copolymers become difficult to melt fabricate.

Polymer Tests

EXAMPLES 4-11

A series of beaker tests were conducted to evaluate the degradation characteristics of small spheres (approximately ¼ inch diameter) of poly(D,L-lactide)(-PLA), crosslinked PLA, and a 80% glycolide/20% lactide copolymer. These experiments were conducted in a 4% calcium/magnesium chloride brine at 150°-160° F. A second series of tests was conducted at 200° F. in a similar brine to ascertain the effect of temperature on degradation time.

In the early stages of the experiment, the amount of physical degradation could be semi-quantitavely evaluated by measuring the hardness of the partially consumed specimens using a conventional Shore-A2 durometer. Durometer measurements were made on specimens taken directly from the test vials daily and on specimens which were allowed to cool prior to measurement. In this fashion, the relative thermoplasticity between samples at a given stage of degradation was determined. Where the samples reverted to fluids, this technique was necessarily abandoned and qualitative observations were substituted.

The materials, conditions and observations are presented in tabular form below.

The tests indicate that both PLA and crosslinked PLA are suitable for use as fluid loss control agents.

EXAMPLE 4

Degradation of Poly(D,L-lactide) Spheres in 2% $MgCl_2$-2% $CaCl_2$ Brine at 150°–160° F.

| Elasped Time (hr) | | Observation |
|---|---|---|
| | (a) | Hardness at 160° F. (Shore A-2 durometer), if possible |
| | (b) | Hardness at ambient (room) Temp (Durometer if possible) |
| | (c) | Description at 160° F. |
| 2 | (a) | 55 |
| | (b) | 100 |
| | (c) | non-sticky, compliant, thermoplastic mass |
| 8 | (a) | 30 |
| | (b) | 100 |
| | (c) | non-sticky, compliant, theromplastic mass |
| 24 | (a) | 10 |
| | (b) | 100 |
| | (c) | non-sticky, very compliant, thermoplastic |
| 48 | (a) | 0 |
| | (b) | 30 |
| | (c) | sticky/tacky mass, very compliant but will not flow |
| 72 | (a) | O, flows readily (heavy syrup) |
| | (b) | O, "hardness" to a gummy mass |
| | (c) | extremely sticky/tacky fluid |
| 98 | (a) | O, flows readily |
| | (b) | O, will not harden — only viscosifies |
| | (c) | some dissolution evident, very sticky fluid |
| 123 | (a) | O, flows very readily |
| | (b) | O, remains fluid — "does not" viscosity |
| | (c) | approximately 85% dissolved |
| 144 | (a) | (Same as 123 hr) |
| | (b) | (Same as 123 hr) |
| | (c) | approximately 90% dissolved |
| 168 | (a) | (Same as 123 hr) |
| | (b) | (Same as 123 hr) |
| | (c) | only slight residue on bottom of vial |
| 192 | (c) | residue has broken up into small flakes, degradation is complete |

EXAMPLE 5

Degradation of crosslinked poly(D,L-lactide) spheres in 2% $MgCl_2$-2% $Cacl_2$ Brine at 150°–160° F.

| Elasped Time (hr) | | Observation |
|---|---|---|
| | (a) | Hardness at 160° F. (Shore A-2 durometer), if possible |
| | (b) | Hardness at Rm Temp (durometer, if possible) |
| | (c) | Description at 160° F. |
| 2 | (a) | 70 |
| | (b) | >100 |
| | (c) | non-sticky, deformable, thermoplastic mass |
| 8 | (a) | 35 |
| | (b) | >100 |
| | (c) | non-sticky, compliant, thermoplastic mass |
| 24 | (a) | 30 |
| | (b) | >100 |
| | (c) | non-sticky, compliant, thermoplastic mass |
| 48 | (a) | 30 |
| | (b) | 80 |
| | (c) | non-sticky, very compliant thermoplastic mass . . . can still be retrieved in one mass |
| 72 | (a) | O, will flow slightly |
| | (b) | O, will harden to a gummy mass |
| | (c) | extremely sticky semi-solid |
| 98 | (a) | O, very heavy syrup, will flow |
| | (b) | O, will not harden . . . will viscosify and no longer flow |
| | (c) | extremely sticky, viscous fluid |
| 123 | (a) | syrupy fluid flows readily |
| | (b) | remains fluid, somewhat inc. viscosity |
| | (c) | extremely sticky fluid, 50% dissolved |
| 144 | (a) | very fluid, no longer "syrupy" |
| | (b) | remains fluid, |
| | (c) | 75–80% degraded, remains tacky |
| 168 | (a) | Not applicable |
| | (b) | Not applicable |
| | (c) | only small amount of residue coating on bottom of vial |
| 192 | (c) | very finely divided residue suspended off bottom |

EXAMPLE 6

Degradation of 80% Glycolide/20% Lactide Copolymeric Spheres in 2% $MgCl_2$-2% $CaCl_2$ Brine at 150°–160° F.

| Elasped Time (hr) | | Observation |
|---|---|---|
| | (a) | Hardness at 160° F. (Shore A-2 durometer, if possible) |
| | (b) | Hardness at Rm Temp (durometer, if possible) |
| | (c) | Description at 160° F. |
| 2, 4, 8, and 24 | (a) | 100 |
| | (b) | 100 |
| | (c) | no observable change |
| 48 | (a) | 60 loading on durometer will crush through the surface |
| | (b) | not applicable |
| | (c) | continuous, non-compliant, rigid mass |
| 72 | (a) | not applicable |
| | (b) | not applicable |
| | (c) | degradation is proceeding into the sphere - presumably being diffusion limited |
| 98 | (c) | sphere reduced to a granular mass upon retrieval - grains are rigid, non-sticky, grainsize about 2 mm+ |
| 123, 144 158, 192 & 216 | (c) | hydrolysis continuing as evidenced by continually reduced grain size |
| 240 | (c) | particle size is generally less than 1 mm |
| 312 | (c) | material has been reduced to a finely divided particulate suspension of particles, requires about 30 minutes to settle |
| 360 | (c) | no appreciable change from 312 hours |

EXAMPLE 7

Degradation of PLA Spheres in 2% KCl Brine Maintained at 200° F.

| Elasped Time (hr) | Observations (including durometer hardness where applicable) |
|---|---|
| 2–4 | Extremely compliant, sticky thermoplastic mass, Od at 200° F.; 100 at room temperature |
| 8 | Viscous, thermoplastic semi-solid which will not flow, tacky, 0 at room temperature |
| 24 | Flows very easily in brine, some dissolution, very sticky at room temperature |
| 48 | Completely degraded . . . only a slight linty residue suspended in brine remains |

EXAMPLE 8

Degradation of Crosslinked PLA Spheres in 2% KCl Brine Maintained at 200° F.

| Elasped Time (hr) | Observations (including durometer hardness where applicable) |
|---|---|
| 2–4 | Extremely compliant, sticky, thermoplastic mass, about 20 hardness when hot and 100 at room temperatire |
| 8 | Viscous, sticky, thermoplastic semi-solid which will not flow, 0 at 200° F., hardness to approximately 100 at room temperature |
| 24 | Viscous, syrupy fluid having 2 distinct viscosity "layers" - a lower viscosity upper region and a relatively higher viscosity lower layer, very sticky/tacky at room temperature |
| 48 | Completely degraded, finely divided residue remains suspended in clear brine |

EXAMPLE 9

Degradation of 80% Glycolide/20% Lactide Copolymeric Spheres in 2% KCl Maintained at 200° F.

| Elasped Time (hr) | Observations (including durometer hardness, where applicable) |
|---|---|
| 2–4 | Material remains rigid, non-sticky, non-compliant mass, surface can be penetrated by durometer (65) when hot, 100 at room temperature |
| 8 | Surface crumbles under 50 load, degradation is apparently advancing from surface inwardly (apparently diffusion controlled hydrolysis) |
| 24 | Sphere is extremely weak, crimbles upon retrieval from vial, granular material remains |
| 48 | Extremely friable granules remain, 1-2 + mm grain size |
| 72 | Grain size diminishing, not much diisolution apparent |
| 120 | Sphere has been reduced to a suspension of platey crystals, very friable, and all less than 1 mm in grain size |

EXAMPLES 10 & 11

An experiment was devised to demonstrate using PLA and crosslinked PLA materials in conjunction with oil well diversion operations. In these tests, the larger physical form of the material, the degradable PLA or crosslinked PLA ball sealer (diameters of about one-half inch), was tested.

The test apparatus consisted of a high pressure core holder containing a 4" long × 1¾" diameter Berea sandstone core which was immersed in a constant temperature bath maintained at 150°–160° F. The core holder was fitted with piping and pressure gages so that the flowrate through the core at a corresponding pressure differential could be measured periodically. A simulated perforation was constructed by epoxying a steel plate onto the face of the Berea core and then drilling a ¼" diameter × ¾" deep hole through the plate and axially into the core.

The test procedure consisted of (1) saturating the core with a 2% KCl brine, (2) placing the core into the core holder and immersing the holder into the 150°–160° F. bath, (3) measuring the initial effective permeability of the core-perforation system, (4) removing the core-perforation, and (5) returning the core-holder to the bath and applying a constant pressure differential of 200 psi across the ball seated on the perforation. The application of the pressure differential across the ball sealer in the 150°–160° F. brine envirionment caused the ball to extrude into the perforation to fill the perforation and thereby effectively plug the perforation.

Daily attempts were made to establish flow into the Berrea core as the polymer was undergoing degradation (in most cases flow could be initiated 1–2 days after sealing the perforation with the sphere). Once flow was established into the core, the resistance to flow (measured as permeability) was monitored on a daily basis. In all cases permeability continued to increase with increased time and in most cases virtually 100% of the initial permeability was recovered after a suitable amount of time had elapsed for the polymer to degrade.

The first test, example 10, was a ½-inch ball sealer comprising the polymer poly(D,L-lactide) having the following properties $M_w = 91,600$, $M_n - 20,100$. The results are shown in FIG. 1.

In the second test, example 11, the ball sealer was made of crosslinked poly(D,L-lactide). The results are shown in FIG. 2.

Figure 2:
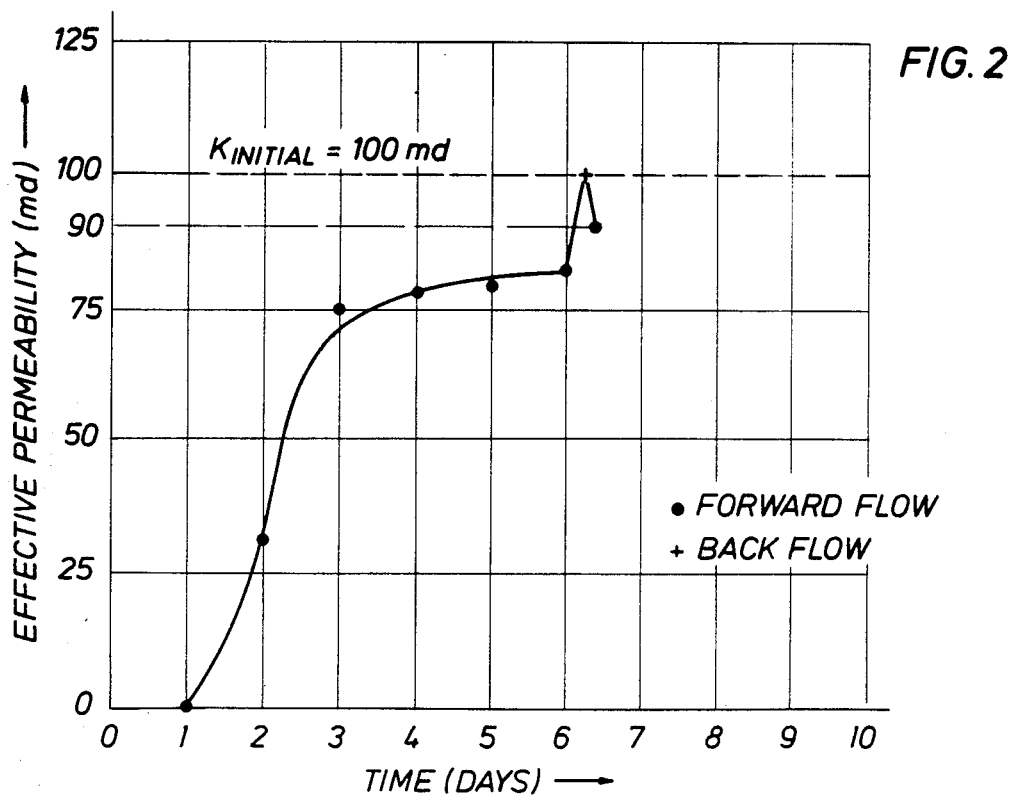
FIG. 2 is a graph illustrating the degradability of a crosslinked polymer of the present invention.

FIGS. 1 and 2 are representative examples of PLA or crosslinked PLA ball sealers degrading in these core tests. In both of these cases the final permeability measured approached the initial virgin permeability determined for the system. For example, FIG. 1 shows that under forward flow conditions only, upon degradation of the ball, the core had substantially reestablished its initial permeability. In FIG. 2, the crosslinked PLA specimen, after backflushing the core, recovered 90% of the initial permeability in only 6 days in this relatively low temperature application.

These core tests serve to verify that any damage a formation would suffer when exposed to the polymers of the present invention as diverting or fluid loss agents would be minimal. Under field conditions where backflushing would take place, little damage would be anticipated.

While an embodiment and application of this invention has been shown and described, it will be apparent to those skilled in the art that many more modifications are possible without departing from the inventive concepts herein described. The invention, therefore, is not to be restricted except as is necessary by the prior art and by the spirit of the appended claims.

We claim:

1. A wellbore fluid for reducing the permeability of a subterranean formation penetrated by a wellbore comprising a fluid having dispersed therein discrete solid structures of a polymer having the repeating unit:

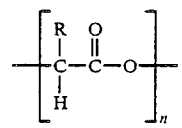

wherein R is H, $C_1$ to $C_4$ alkyl and n is sufficiently large to form a solid polymer, said polymer being substantially insoluble in said wellbore fluid and degradable in the presence of water at an elevated temperature to oligomers which are at least partially soluble in oil or water.

2. The wellbore fluid according to claim 1 wherein said polymer is selected from the group consisting of poly(D,L-lactide), crosslinked (D,L-lactide) and copolymers of glycolide and D,L-lactide.

3. The wellbore fluid according to claim 1 wherein said structures have a size from about 0.1 micron to about 1500 microns.

4. The wellbore fluid according to claim 1 wherein said fluid comprises water.

5. The wellbore fluid according to claim 1 wherein said fluid comprises oil, xylene or toluene.

* * * * *